UNITED STATES PATENT OFFICE.

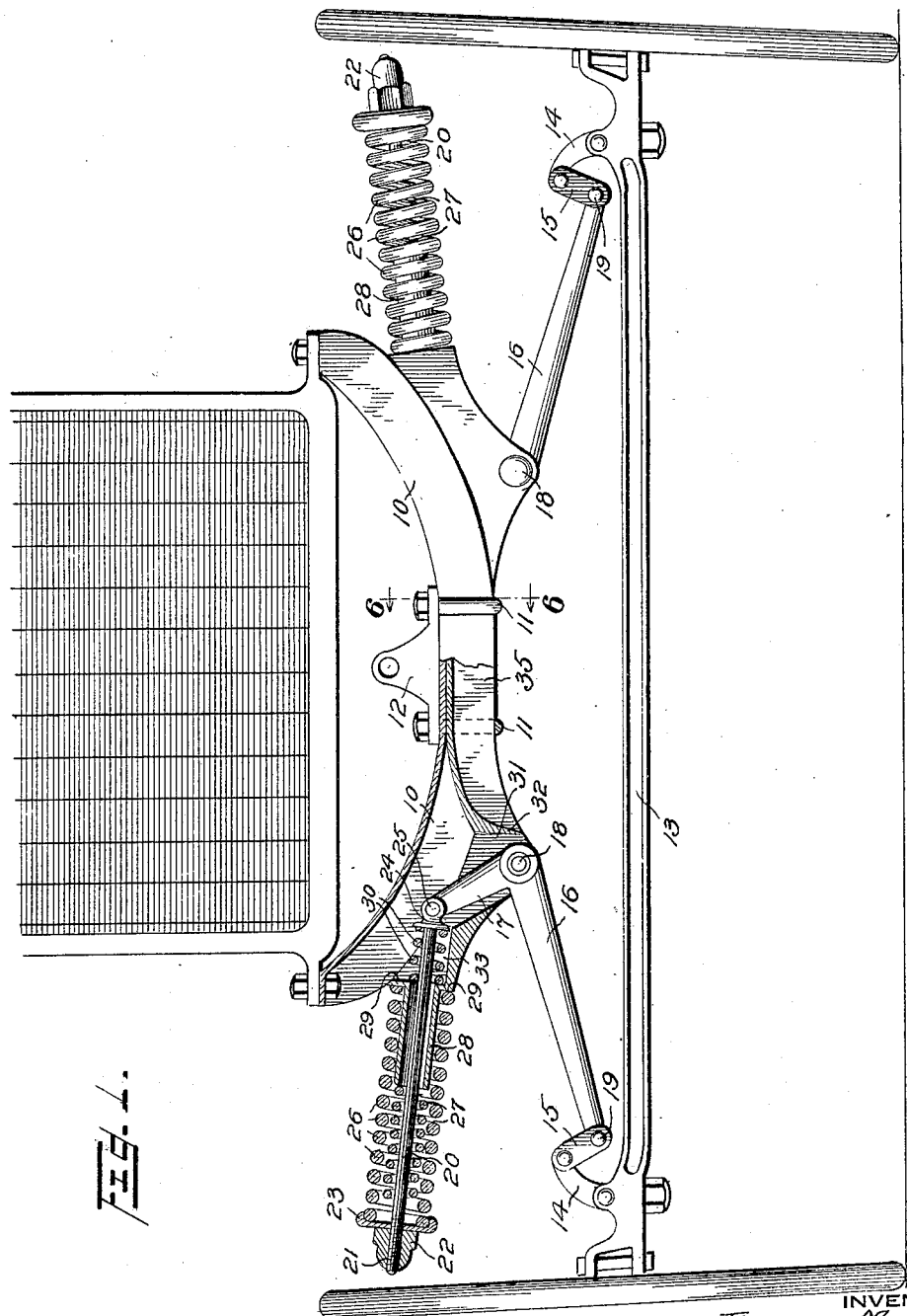

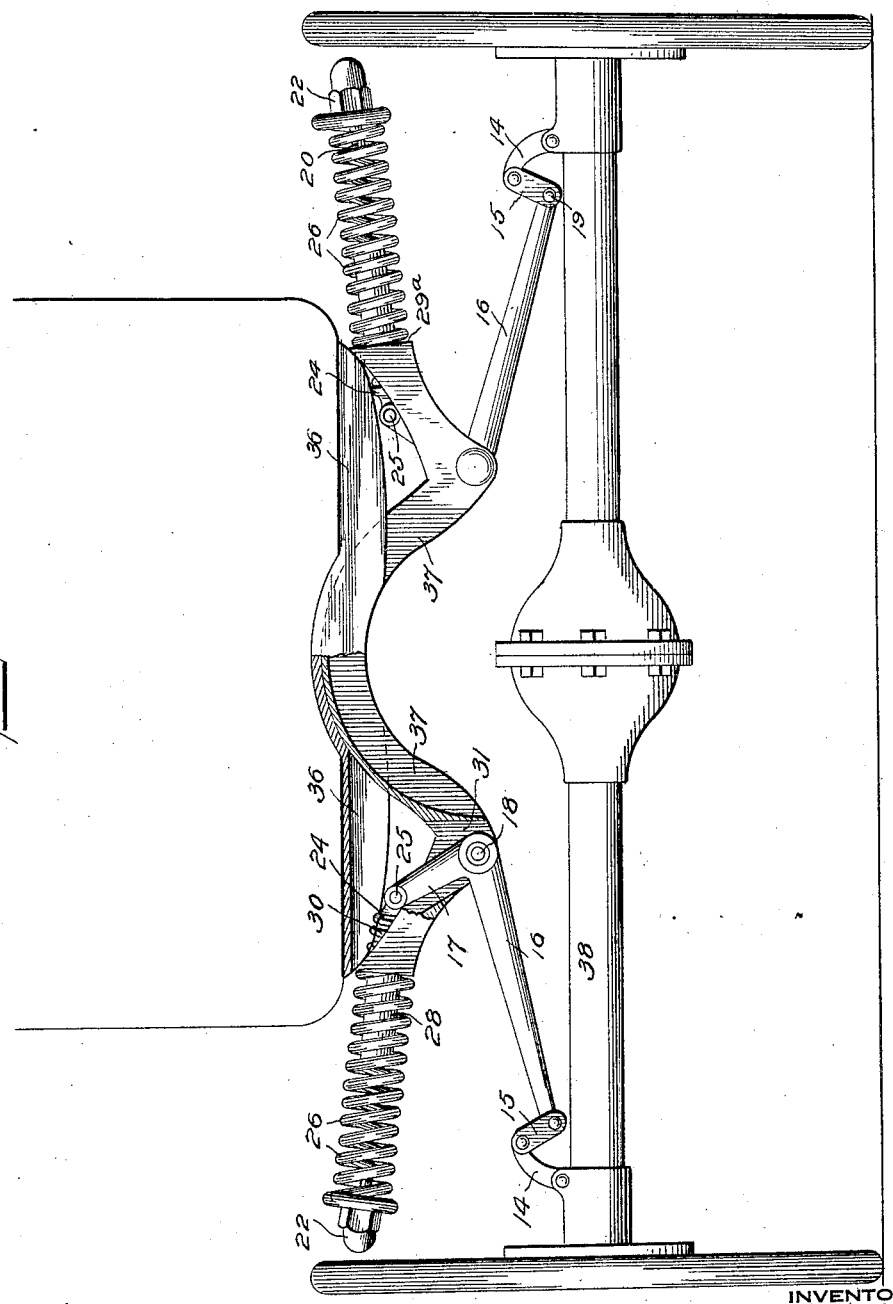

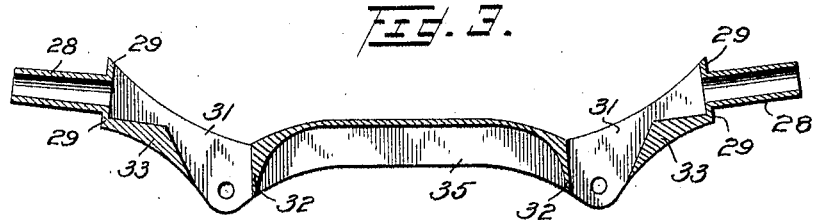
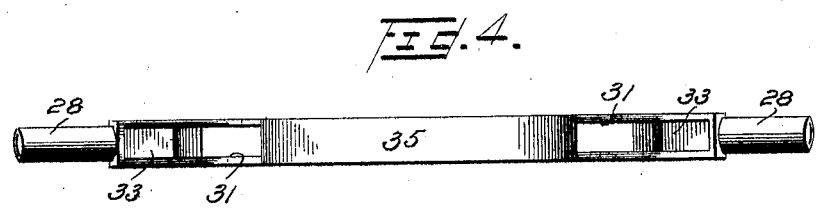
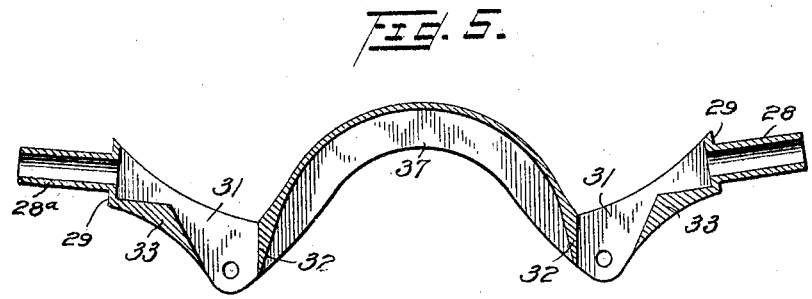
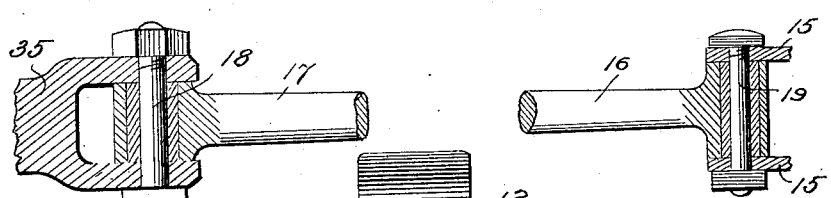
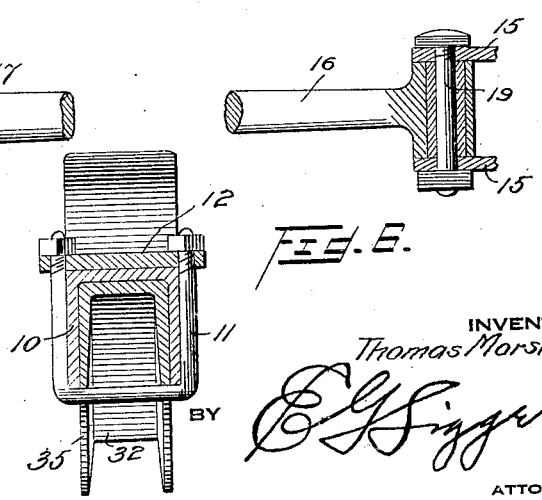

THOMAS MORSKI, OF MANISTEE, MICHIGAN, ASSIGNOR TO AMERICAN MOTOR PATENTS COMPANY, A CORPORATION OF DELAWARE.

COMBINED SPRING AND SHOCK ABSORBER.

1,408,124.  Specification of Letters Patent.  Patented Feb. 28, 1922.

Application filed April 2, 1920. Serial No. 370,793.

*To all whom it may concern:*

Be it known that I, THOMAS MORSKI, a citizen of Poland, residing at Manistee, in the county of Manistee and State of Michigan, have invented a new and useful Combined Spring and Shock Absorber, of which the following is a specification.

The present invention relates to combined springs and shock absorbers.

The general object of the invention is to provide a shock absorber which may be adapted for all makes of automobiles and which, when properly installed, will absorb the shocks encountered or imparted to the axles of the vehicle as it is traveling over the ground.

The special object of the invention is to provide a spring suspension for Ford cars, which suspension is placed crosswise to take the place of the usual transverse elliptic springs provided with such cars. However, the invention is not confined to use with any specific make of automobile, for it is only necessary to use the proper types of clamps and shackles to adapt the spring suspension to all makes of cars; and while the embodiment of the invention herein described is one which is placed transversely of the vehicle, it may readily be placed longitudinally thereof without the exercise of anything more than mechanical skill.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 1 is a front elevation, with parts in cross section, of a Ford automobile showing the invention applied.

Fig. 2 is a like view of the rear of the same.

Fig. 3 is a longitudinal cross section of the main supporting member provided for the front of the vehicle.

Fig. 4 is a top plan view of the same.

Fig. 5 is a longitudinal cross section of the main supporting member provided for the rear of the vehicle.

Fig. 6 is a cross section on the line 6—6 of Fig. 1, distant parts being omitted.

Fig. 7 is a cross section showing the pivotal connection between the main supporting member and the bell crank lever.

Fig. 8 is a detail cross section showing the pivotal connection between the end of the bell crank lever and the shackle or link provided upon the axles of Ford cars.

The numeral 10 represents the front member of the car to which, ordinarily, the elliptic springs are attached. Upon this front member are carried the clamping plate 12 and the U-bolts or clips 11 for the purpose of holding said springs. The front axle 13 carries pivotally mounted links 14 near either end, while the links 14 carry the shackles 15. All the parts so far mentioned are provided with Ford cars and are used without modification in connection with the device of the present invention.

A main supporting member is clamped to the front member 10 by means of the U-bolts 11. This main supporting member comprises a rigid bar set transversely of the body of the car below the front member 10 and is clearly illustrated in Figs. 3 and 4 of the accompanying drawings.

A bell crank lever is pivotally mounted upon the main supporting member short of either end thereof. The bell crank levers each comprise a long arm 16 and a short arm 17, said levers being mounted on pins 18 connected to the main supporting member and being connected with the shackles 15 by pins 19 at the outer ends of arms 16.

The free end of the short arm 17 of the bell crank lever is pivotally connected with a rod 20, as by a pin or the like 25. The rod 20 is screw threaded at its outer end, as indicated at 21, and there carries an adjusting nut 22. Also carried by this rod is a cap 23, which the nut 22 bears against to effect adjustment of the springs supported upon the rod. The inner end of the rod 20 near the pivot has a head 24.

A hollow sleeve 28 is provided with either end of the main supporting member, through which sleeve the rod 20 passes. This sleeve is integral with the main supporting member and where joined therewith provides an annular shoulder 29 against which one end of a spiral spring 26 bears. The other end of the spring 26 bears against the inner face of the cap 23. Adjustment of the tension of the spring 26 is effected by turning the nut 22, thus forcing the cap 23 inwardly, thereby compressing said spring. A smaller spiral spring 27 is housed or enclosed by the spring 26. The spring 27 is considerably shorter than the spring 26, and while held upon the rod 20 is normally under no compression in contradistinction to the spring 26 which is always under compression. The spring 27, by reason of the angular disposition of the rod 20, best seen in Fig. 1, normally rests against the outer end of the sleeve 28, but only when the spring 26 undergoes considerable compression is the spring 27 compressed by inward movement of the disk or cap 23.

The main supporting member is provided with a hollowed-out portion 31 in which the short arm 17 of the bell crank lever is free to move. A recess 33 communicating with the hollowed-out portion 31 is also provided, such recess communicating with the sleeve 28. A recoil spring 30 is carried by the rod 20 within this recess and bears against the inner end of the sleeve 28 as well as against the head 24.

The main supporting member has a channel section intermediate those portions which pivotally support the bell crank levers. Such channel section is indicated by the numeral 35. Walls 32 are provided at each end of said channel section, against which the short arms 17 of the bell crank levers will not strike because of the ample room provided by the hollowed-out portion 31.

In Fig. 2, an analogous construction is shown where the rear end of a Ford automobile is to be supported. Here is shown a rear body supporting member 36 to which a properly shaped main supporting member 37 is secured. The main supporting member 37 is obviously like the main supporting member provided for the front end of the vehicle except that it is curved to fit the rear body supporting member 36. A comparison of Figs. 3 and 5 will indicate the similarity between the main supporting members provided for the front and rear ends of the car. Otherwise the spring suspension for the rear end of the machine is the same as that described for the front end thereof. This similarity is indicated in the drawings, where like parts are given like numerals. The rear axle 38 is here connected by the same linkage heretofore described with load bearing recoil springs as shown. The parts for suspending the rear end of the machine will, however, be made stronger and heavier than the parts provided for the front end thereof.

In action, when the wheels strike an obstruction in the road and jump up, the outer end of the arm 16 is raised, whereupon the upper end of the arm 17 is moved inwardly with respect to the car compressing the spring 26 and, if the movement is violent enough, the spring 27 as well. There being one bell crank lever connected to either end of each axle, it is obvious that if one wheel strikes an obstruction the shock will be absorbed without being communicated to the other wheels. If the wheels fall into a hole in the road, or if the body attempts to rebound, the arm 17 of the bell crank lever is moved outwardly with respect to the car, thereby compressing the recoil or rebound spring 30; thus the body of the car is balanced between the load bearing and the rebound spring, enabling it to be driven over the roughest roads without discomfort. By the use of the invention, a Ford car, which is well known to be uncomfortable to ride in over bad roads, has its riding qualities completely changed.

From a mechanical standpoint the construction of the present invention is very simple and easily installed and is inexpensive to manufacture. There are no intricate parts and the springs are not liable to get out of order. The invention uses the same shackles, bolts and clamps as the ordinary elliptic springs provided with Ford cars and can actually be put in place quicker and with less work than the elliptic springs.

An important feature of the invention is the provision of the shoulder at the base of the sleeve 28. This shoulder provides means against which the inner end of the principal load-carrying spring bears and also provides means against which the rebound or recoil spring bears. The arcuate movement of the lever arm 17 is not interfered with although the rod is passed through the sleeve, since the sleeve has a sufficiently large bore to permit free rocking of the lever and therefore free oscillation of the rod.

What is claimed is:

1. In a device of the character described, a supporting member secured to the body of the car, and consisting of an intermediate channel section, a hollowed out portion on each side of the channel section, and an outwardly extending sleeve at each end of said member, levers each connected at one end with the axle and at the other end pivoted in the hollowed out portion of said member, and spring means mounted on the sleeve and having connection with the said other end of said levers.

2. In a device of the character described, a supporting member secured to the body of the car, a lever connected at one end with the axle of the car and pivotally mounted on the member, means connected to the other end of the lever and supported by the corresponding end of the member, and springs carried upon said means, one spring being interposed between the second-named end of the lever and the member, another spring being interposed between the aforesaid means and the member.

3. In a device of the character described, a supporting member secured to the body of the car, a lever connected at one end with the axle of the car and pivotally mounted on the member, means connected to the other end of the lever and supported by the corresponding end of the member, springs carried upon said means, one spring being interposed between the second-named end of the lever and the member, another spring being interposed between the aforesaid means and the member, and a third spring likewise interposed and enclosed by the second spring and effective to absorb shocks only after the second spring has yielded.

4. In a device of the character described, a supporting member secured to the body of the car and having an integral sleeve at each end, levers each connected at one end with the axle of the car and pivotally mounted on said member beyond the inner end of said sleeve, rods each pivotally connected to the other end of the lever and loosely passed through said sleeve, and spring means carried by the rods for restraining the movements of said levers.

5. In a device of the character described, a supporting member secured to the body of the car, a lever connected at one end with the axle of the car and pivotally mounted on the member, a rod pivotally connected to the other end of the lever and loosely passed through a portion of the member, and springs carried by the rod on each side of the outer end of the member, said springs being alternately compressed by opposite movements of the lever.

6. In a device of the character described, a supporting member secured to the body of the car, a lever connected at one end with the axle of the car and pivotally mounted on the member, means connected to the other end of the lever and supported by the corresponding end of the member, said means carrying springs, the member being provided with a sleeve at an end thereof and with a shoulder where the sleeve is joined to the member, said springs being interposed between said shoulder on either side thereof and the means aforesaid.

7. In a device of the character described, a supporting member secured to the body of the car, a lever connected at one end with the axle of the car and pivotally mounted on the member, a rod pivotally connected to the other end of the lever, a sleeve provided at the end of the member and receiving said rod loosely, a spring mounted upon the sleeve and rod and bearing against the member where the sleeve joins therewith, and a second spring partly housed by said member and also carried by the rod and bearing against said member.

8. In a device of the character described, a supporting member secured to the body of the car, a lever connected at one end with the axle of the car and pivotally mounted on the member, a rod pivotally connected to the other end of the lever, a hollow sleeve provided at the outer end of the member, said rod being loosely received by said sleeve, a spring mounted upon the sleeve, means on the rod cooperating with means on the member to hold said spring under compression, a smaller spring carried upon the rod beyond the outer end of the sleeve and enclosed by the first-mentioned spring, and a third spring housed within the member and carried by the rod and bearing against both elements.

9. In a device of the character described, a supporting member secured to the body of the car, a bell crank lever pivotally mounted on the member, said lever comprising a long arm and a short arm, the long arm being connected with the axle of the car and the short arm being housed within said member, a rod connected to the short arm of the lever, a hollow sleeve provided on the other end of the member and receiving said rod, springs carried by said rod and sleeve for carrying the load of the car, and a spring housed by said member and also supported upon the rod for restraining the rebound of the car.

10. In a device of the character described, a supporting member secured to the body of the car, a lever pivoted upon said supporting member and connected with the axle, resilient means mounted upon the outer end of the supporting member for restraining movement of said lever, said member housing a portion of said lever and a part of the resilient restraining means, and means joined to the lever for holding the restraining means to the end of the member.

11. In a device of the character described, a supporting member secured to the body of the car, a lever pivoted upon said supporting member and connected with the axle, resilient means mounted upon the outer end of the supporting member for restraining movement of said lever, said member having a cut-away portion receiving the lever, a recess receiving a part of the resilient means, a sleeve supporting another part of the resilient means, and a shoulder against which the resilient means bears.

12. In a device of the character described, a supporting member secured to the body of the car, said supporting member having a hollow sleeve at each end, a shoulder provided at the base of said sleeve where joined to the member, a recess provided on the member on said side of said shoulder opposite to the side on which the sleeve lies, said recess being of larger dimensions than the bore of the sleeve, a rod loosely received within said recess and sleeve and projecting beyond the end of the latter, means for connecting said rod with the axle of the car, a spring housed within the recess and held by the rod for cushioning the rebound of the car, and a spring mounted upon the outer end of the rod and extending beyond said sleeve for bearing the load of the car.

13. In a device of the character described, a supporting member secured to the body of the car, a lever connected at one end with the axle of the car and pivotally mounted on the member, a rod pivotally connected to the other end of the lever, a hollow sleeve provided at the outer end of the member, said rod being loosely received by said sleeve, a spring mounted upon the sleeve, means on the rod cooperating with means on the member to hold said spring under compression, a smaller spring carried upon the rod beyond the outer end of the sleeve and enclosed by the first-mentioned spring, said smaller spring coming into action only when the first-mentioned spring is under considerable compression.

14. In a shock absorber for vehicles, a bell crank lever including a long arm and a short arm, the long arm being connected at its end to the axle near one end of the same and extending above the axle and inwardly toward the central portion thereof, means on the vehicle body for mounting the lever, the short arm being inclined upwardly, and means connected to the end of the short arm and extending wholly outside of said end to restrain resiliently any swinging of the lever in either direction, said latter means also extending beyond the sides of the vehicle and above the axle, the mounting means for the lever serving as an abutment for the resilient restraining means.

In testimony, that I claim the foregoing as my own, I have hereto affixed my signature.

THOMAS MORSKI.